(12) United States Patent
Fujita et al.

(10) Patent No.: US 6,376,093 B1
(45) Date of Patent: Apr. 23, 2002

(54) POLYAMIDE FILM AND POLYAMIDE LAMINATE FILM

(75) Inventors: Shinji Fujita; Masaki Sugimoto; Shigeru Komeda; Masazumi Iwanishi; Masayoshi Satoh; Chikao Morishige; Kiyoshi Iseki; Seiichiro Yokoyama, all of Ohtsu (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 09/317,002

(22) Filed: May 24, 1999

(30) Foreign Application Priority Data

May 26, 1998 (JP) .......................... 10-143671
Feb. 23, 1999 (JP) .......................... 11-045140
Feb. 23, 1999 (JP) .......................... 11-045142

(51) Int. Cl.$^7$ ............................. B32B 27/08
(52) U.S. Cl. .................. 428/474.4; 428/474.7; 428/474.9; 428/475.5; 428/694 SL
(58) Field of Search ............. 428/474.4, 474.7, 428/474.9, 475.5, 694 SL

(56) References Cited

FOREIGN PATENT DOCUMENTS

| DE | 2165399 | | 7/1972 |
|---|---|---|---|
| DE | 4004612 | | 7/1991 |
| JP | 10025415 | * | 11/1990 |
| JP | 3-146343 | | 6/1991 |
| JP | 154128 | * | 1/1998 |
| JP | 10-025415 | | 1/1998 |

OTHER PUBLICATIONS

Database WPI, Section Ch., Week 199814, Derwent Publications, Ltd., London, GB; Class A23, AN 1998–154128 XP002141692 & JP 10 025415 A (Mitsubushi Eng. Plastics KK), Jan. 27, 1998.

* cited by examiner

Primary Examiner—Leszek Kiliman
(74) Attorney, Agent, or Firm—Kenyon & Kenyon

(57) ABSTRACT

A polyamide film satisfying (a) a haze value of not more than 5.0%, (b) a coefficient of kinetic friction (A) of not more than 1.0 under 50% humidity, the coefficient (A) being measured with regard to fiction between the same two polyamide films, and (c) a ratio of coefficients of kinetic friction (B)/(A) of not more than 1.5, the (B) being a coefficient of kinetic friction at 65% humidity, a billy oriented polyamide film showing an average dimensional change of not more than 3.0% and a difference between the smallest dimensional change and the largest dimensional change of not more than 2.0%, between before immersion in hot water at 95° C. and during the immersion, and an average dimensional change of not more than 4.0% and a difference between the smallest dimensional change and the largest dimensional change of not more than 2.0%, between the film without treatment and the film after withdrawal from said hot water; and a polyamide laminate film containing the film as a substrate layer. The films afforded by the present invention have superior properties and are industrially advantageous in a broad range of applications.

16 Claims, No Drawings

POLYAMIDE FILM AND POLYAMIDE LAMINATE FILM

TECHNICAL FIELD OF THE INVENTION

The present invention relates to a polyamide film (inclusive of sheet, hereinafter the same throughout this specification) having superior transparency, resistance to fatigue from flexing and slip characteristic, particularly such film superior in slip characteristic under high humidity. More particularly, the present invention relates to a polyamide laminate film superior in properties of a wrapping film for fresh food, processed food, pharmaceutical products, medical equipment, electronic parts and the like, such as gas barrier property and moisture-proof property, and showing superior transparency and handling property.

BACKGROUND OF THE INVENTION

Polyamide films have been conventionally used for a broad range of applications inclusive of wrapping purpose, because they are superior in mechanical properties (e.g., tenacity, flexing resistance and the lie), optical property, thermal property, gas barrier property and the like. On the other hand, conventional polyamide films are associated with problems in that they show high moisture absorption resulting from the property of the polyamide resin itself, which in practice results in lower slip characteristic and extremely degraded handling property due to an increased contact area by moisture absorption when in use in a highly humid environment.

To overcome such problems, a method for decreasing coefficient of friction between films or that between a film and a material in contact with the film has been studied. To be specific, inorganic fine particles inert to polyamide are contained in a polyamide film to decrease the coefficient of friction of the film surface, or a method comprising addition of an organic surface lubricant has been employed.

The above-mentioned conventional methods suffer from a problem in that greater amounts of inorganic fine particles added to minimize the coefficient of friction cause lower transparency of the polyamide resin film. The above-mentioned coefficient of friction and the transparency of the film are in an ambivalent relationship, and a polyamide resin film having both properties of fine slip characteristic and transparency has been unattainable. Particularly, a polyamide resin film satisfying the transparency and slip characteristic under high humidity has been unattainable.

From the practical view, the use of an organic surface lubricant lowers the surface energy of the film and enhances slip characteristic. However, adhesiveness in printing or Laminating on the film surface also becomes lower and the amount of the organic lubricant to be added cannot be increased in view of the practical aspect of the film.

In accordance with the varying food distribution systems and dietary habits in recent years, the food packaging style and mode have been strikingly changing, which in turn has created an increasing demand toward high quality wrapping films.

A degraded quality of a product, which is caused by temperature, moisture, oxygen, ultraviolet rays, microorganisms such as bacteria and mold, and the like during distribution and sales, leads to serious problems of loss of sales and insufficient food hygiene. Such degradation of quality has been conventionally supressed by adding an antioxidant, a preservative and the like directy to food. In view of increasing levels of strict regulation imposed on food additives for the protection of consumers, however, decease in the amount to be added or elimination of addition itself has been demanded. Under the circumstances, a demand has been rising toward a wrapping film having smaller vapor and moisture permeabilities and which does not degrade food value due to freezing, boiling treatment, retort treatment and the like.

To be specific, when wrapping fish meat, meat, shellfish and the like, oxidation and spoilage of protein, fats and oils and the like need to be inhibited but taste and freshness need to be retained. This requirement is met by cutting off air permeation by the use of a wrapping material having superior gas barrier property. In addition, gas barrier film used for wrapping food contributes to the retention of flavor of the content and inhibition of moisture permeation. As a result, dry food is not deteriorated by the absorption of moisture and water-containing food is not spoiled or solidified by the evaporation of moisture, thus enabling retention of fresh flavor present at the time of wrapping for an extended period of time.

For the above-mentioned reasons, it is considered extremely important that a wrapping film used for, for example, food made from boiled fish paste such as boiled fish sausage, dainty products such as butter and cheese, fermented soybean paste, tea, coffee, ham and sausage, instant food, confectionery such as castella and biscuit, and the like, should have gas barrier property and moisture-proof property. These properties are not required only of a film for wrapping food. They are significantly important for a film used for wrapping medical products that require handling in a sterilized state and electronic parts that require rust-proof property.

As a film having superior gas barrier property, there have been known, for example, a film wherein a metal foil such as an aluminum foil is laminated on a plastic film, and a film having a coating of vinylidene chloride or ethylene-vinyl alcohol copolymer. In addition, as a film utilizing an inorganic thin film, a laminate having a vapor deposition layer of silicon oxide, aluminum oxide and the like has been known.

In practice, a sealant layer may be formed by dry laminating on a printing layer or an adhesive. Alternatively, a sealant layer is formed by extrusion laminating to give a polyamide laminate film and this laminate film is used, for example, to prepare a bag. After packing the bag, the opening is heat sealed, whereby seasoning such as fermented soybean paste, soy sauce and the like, water-containing food such as soup, retort food and the like, pharmaceutical products and the like in package bags have been supplied to general consumers.

The above-mentioned conventional gas barrier films each have the following problems. A laminate having an aluminum foil as a gas barrier layer is superior in economic aspect and gas barrier property, but it is associated with a problem in that opacity thereof hides contents after wrapping and that it cannot be cooked in a microwave oven, since the film does not pass microwaves.

A film coated with vinylidene chloride or ethylene-vinyl alcohol copolymer has insufficient gas barrier property against water vapor, oxygen and the lie, and shows marked degradation of the property by a high temperature treatment. The film coated with vinylidene chloride generates chlorine gas on incineration, and may cause air pollution.

Thus, a resin film has been proposed that has an inorganic vapor deposition layer of silicon oxide, aluminum oxide and the like as a gas barrier layer. As the base film on which silicon oxide, aluminum oxide and the like can be vapor-deposited, a polyester film (PET) superior in dimensional stability has been conventionally used. It typically has a structure of a laminate of PET/vapor deposition layer/adhesive layer/PET/adhesive layer/unoriented polypropylene (CPP) and the like. Such laminate film has insufficient strength to stand a fall impact.

In the case of a laminate film of PET/vapor deposition layer/adhesive layer/oriented nylon (ONY)/adhesive layer/unoriented polypropylene (CPP) and the like, the property of nylon to shrink causes degradation of gas barrier property after boiling treatment and retort treatment Therefore, Japanese Patent Unexamined Publication No. 276571/1995 proposes a laminate film using nylon having lower shrinkage percentage upon high temperature hot water treatment This film comprises more number of films to be laminated. Consequently, the film-forming step and process for transport and storage become complicated to make the film economically disadvantageous, and the greater film thickness makes the handling of the film difficult. Thus, the film is impractical.

Meanwhile, a gas barrier film comprising a nylon film as a substrate to be used for deposition has been considered, but the nylon film shows greater dimensional change due to moisture absorption and heating, which makes barrier property unstable. Therefore, the film problematically has degraded gas barrier property particularly after boiling treatment and retort treatment.

To improve gas barrier property, therefore, Japanese Patent Examined Publication No.12649/1995 proposes a laminate film comprising an oriented nylon, which has been heated to decrease shrinkage, as a substrate to be used for deposition. The film is again impractical, because film-forming step and process for transport and storage become complicated. Even if nylon has lower shrinkage percentage upon high temperature treatment (for instance, the total of respective absolute values of dimensional changes in the longitudinal direction and transverse direction by heating at 120° C. for 5 minutes is not more than 20% in Japanese Patent Examined Publication No. 12649/1995), the superior gas barrier property cannot be maintained through boiling treatment using high temperature hot water.

When a nylon film is used as a substrate for vapor deposition and water invades in between the nylon film and the vapor deposition layer, the adhesion between the layers decreases strikingly, and the lower adhesion may lead to the breakage of bag when it is used as a packaging bag, as well as inferior gas barrier property. The gas barrier laminate film having an inorganic vapor deposition layer of silicon oxide, aluminum oxide and the like does not necessarily have sufficient strength of the structure, but rather, is associated with degradation of gas barrier property upon boiling treatment and retort treatment.

Besides these, a gas barrier film has been proposed in Japanese Patent Examined Publication No. 48511/1976, which is transparent to allow visual observation of the content and which is microwavable, wherein $Si_xO_y$ (e.g., $SiO_2$) is vapor-deposited on the surface of a synthetic resin substrate. However, the $SiO_x$ (x=1.3–1.8) vapor deposition layer having superior gas barrier property is somewhat brown, which is unsatisfactory as a transparent gas barrier film. Japanese Patent Unexamined Publication No. 101428/1987 discloses a film having an inorganic vapor deposition layer mainly comprising aluminum oxide, but this film has insufficient gas barrier property and poor flexing resistance.

An $Al_2O_3.SiO_2$ gas barrier layer having boiling resistance and retort resistance has been proposed in Japanese Patent Unexamined Publication No. 194944/1990. This film requires complicated steps of forming the gas barrier layer due to the lamination of $Al_2O_3$ and $SiO_2$, as well as bulky apparatus therefor. Moreover, such film having an inorganic thin film layer as a gas barrier layer is still insufficient from the aspect of the coexistence of gas barrier property and flexing resistance. In other words, superior boiling resistance and retort resistance need a certain film thickness (e.g., approximately not less than 2,000 Å) but greater film thickness leads to low flexing resistance that does not stand a fall impact. As such, there has not been proposed a gas barrier film having sufficient gas barrier property, moisture-proof property, boiling resistance, retort resistance, flexing resistance and resistance to a fall impact.

SUMMARY OF THE INVENTION

It is therefore an object of the present invention is to provide a polyamide film having superior transparency, resistance to fatigue from flexing and fine slip characteristic, that is particularly superior in slip characteristic under high humidity, and that resolves the problems of the above-mentioned conventional polyamide resin film. Another object of the present invention is to provide a polyamide laminate film superior in gas barrier property before and after boiling treatment, transparency and resistance to fatigue from flexing when it is used as a gas barrier film upon formation of an inorganic vapor deposition layer.

Such object can be achieved by the following present invention.

Accordingly, the present invention provides the following.

[1] A polyamide film satisfying the following (a) to (c):
  (a) a haze value of not more than 5.0%,
  (b) a coefficient of kinetic friction (A) of not more than 1.0 under 50% humidity, the coefficient (A) being measured with regard to friction between the same two polyamide films, and
  (c) a ratio of coefficients of kinetic friction (B)/(A) of not more than 1.5, the (B) being a coefficient of kinetic friction at 65% humidity.

[2] The polyamide film of [1], wherein the film has not more than 20 pinholes in a 7-inch square at 25° C. after a fatigue test involving 1000 times of flexing.

[3] The polyamide film of [1], wherein the film comprises a resin (X) which is a mixture and/or copolymer of an aromatic polyamide resin (a) except polyamide resin comprising isophthalic acid and aliphatic diamine, and a polyamide resin (b) comprising aliphatic polyamide resin, or isophthalic acid and aliphatic diamine, wherein the aromatic polyamide resin (a) is contained in a proportion of not less than 10 mol % and not more than 90 mol %, or the film comprises X in a proportion of not less than 5 parts by weight and an aliphatic polyamide resin (Y) in a proportion of not more than 95 parts by weight.

[4] The polyamide film of [1], wherein the film comprises of a resin (X) which is a mixture and/or copolymer of an aromatic polyamide resin (a) except polyamide resin comprising isophthalic acid and aliphatic diamine, and a polyamide resin (b) comprising aliphatic polyamide resin, or isophthalic acid and aliphatic diamine, wherein the aromatic polyamide resin (a) is contained in a proportion of not less than 10 mol % and not more than 90 mol %, in a proportion of 90–4 parts by weight, an aliphatic polyamide resin (Y) in a proportion of 0–95.8 parts by weight and an improver of resistance to fatigue from flexing (Z) in a proportion of 0.2–10 parts by weight.

[5] The polyamide film of [4], further comprising inorganic and/or organic fine particles having an average particle size of 0.5–5.0 μm in a proportion of 0.05–1.0 part by weight relative to the total amount of the resin.

[6] A biaxially oriented polyamide film showing an average dimensional change of not more than 3.0% and a difference between the smallest dimensional change and the largest dimensional change of not more than 2.0%, between before immersion in hot water at 95° C. and during the immersion, and an average dimensional change of not more than 4.0% and a difference between the smallest dimensional change and the largest dimensional change of not more than 2.0%, between the film without treatment and the film after withdrawal from said hot water, said dimensional change being measured with regard to test samples cut out in all directions at 10° pitch from the film.

[7] The biaxially oriented polyamide film of [6], wherein the film comprises two kinds of a layer A and a layer B, the layer A comprising a resin comprising the following X and Y, or X alone, and the layer B comprising a polyamide resin selected from the group consisting of a resin comprising Y alone, a resin comprising Y and X, a resin comprising Y and the following Z, and a resin comprising X, Y and Z, and wherein the film has a layer structure of A/B or A/B/A, (X): a resin which is a mixture and/or copolymer of an aromatic polyamide resin (a) comprising terephthalic acid and aliphatic diamine, or adipic add and meta-xylylenediamine, and a polyamide resin (b) comprising aliphatic polyamide resin, or isophthalic acid and aliphatic diamine, wherein the aromatic polyamide resin (a) is contained in a proportion of not less than 10 mol % and not more than 90 mol %, (Y): aliphatic polyamide resin, (Z): an improver of resistance to fatigue from flexing.

[8] The biaxially oriented polyamide film of [7], wherein the layer A comprises X alone or a combination of X in a proportion of not less than 50 parts by weight and Y in a proportion of not more than 50 parts by weight, and the layer B comprises Y alone or a combination of Y in a proportion of not less than 80 parts by weight, X in a proportion of not more than 10 parts by weight and Z in a proportion of not more than 10 parts by weight.

[9] A polyamide laminate film comprising the polyamide film of any of [1]–[5] and an inorganic vapor deposition layer formed at least on one side of the film.

[10] A biaxially oriented polyamide laminate film comprising the biaxially oriented polyamide film of any of [6]–[8] and an inorganic vapor deposition layer formed at least on one side of the film.

[11] The biaxially oriented polyamide laminate film of [10], further comprising an anchor coat layer between the biaxially oriented polyamide film and the inorganic vapor deposition layer.

[12] The biaxially oriented polyamide laminate film of [10], wherein the inorganic vapor deposition layer is a thin film layer comprising silicon oxide, aluminum oxide or a mixture thereof.

[13] A biaxially oriented polyamide laminate film comprising a biaxially oriented polyamide film, an inorganic vapor deposition layer and a sealant layer, said inorganic vapor deposition layer and then the sealant layer being laminated at least on one side of the biaxially oriented polyamide film, the laminate film showing an average dimensional change of not more than 3.0% and a difference between the smallest dimensional change and the largest dimensional change of not more than 2.0%, between before immersion in hot water at 95° C. and during the immersion, and an average dimensional change of not more tan 2.0% and a difference between the smallest dimensional change and the largest dimensional change of not more than 2.0%, between the film without treatment and the film after withdrawal from said hot water, said dimensional change being measured with regard to test samples cut out in all directions at 10° pitch from the film

[14] The biaxially oriented polyamide laminate film of [13], wherein the billy oriented polyamide film comprises two kinds of a layer A and a layer B, the layer A comprising a resin comprising the following X and Y, or X alone, and the layer B comprising a polyamide resin selected from the group consisting of a resin comprising Y alone, a resin comprising Y and X, a resin comprising Y and the following Z, and a resin comprising X, Y and Z, and wherein the film has a layer structure of A/B or A/B/A:

(X): a resin which is a mixture and/or copolymer of an aromatic polyamide resin (a) comprising terephthalic acid and aliphatic diamine, or adipic acid and meta-xylylenediamine, and a polyamide resin (b) comprising aliphatic polyamide resin, or isophthalic acid and aliphatic diamine, wherein the aromatic polyamide resin (a) is contained in a proportion of not less than 10 mol % and not more than 90 mol %, (Y): aliphatic polyamide resin, (Z): an improver of resistance to fatigue from flexing.

[15] The biaxially oriented polyamide laminate film of [14], wherein the layer A comprises X alone or a combination of X in a proportion of not less than 50 parts by weight and Y in a proportion of not more than 50 parts by weight, and the layer B comprises Y alone or a combination of Y in a proportion of not less than 80 parts by weight, X in a proportion of not more than 10 parts by weight and Z in a proportion of not more than 10 parts by weight.

[16] The biaxially oriented polyamide laminate film of any of [13]–[15], further comprising an anchor coat layer between the biaxially oriented polyamide film and the inorganic vapor deposition layer.

[17] The biaxially oriented polyamide laminate film of any of [13]–[15], wherein the inorganic vapor deposition layer is a thin film layer comprising silicon oxide, aluminum oxide or a mixture thereof.

DETAILED DESCRIPTION OF THE INVENTION

The polyamide film of the present invention has a haze value of not more than 5.0% and a coefficient of kinetic friction (A), as measured with regard to the friction between the same two polyamide films, of not more than 1.0 under 50% humidity, and a ratio (B)/(A) wherein (B) is a coefficient of kinetic friction under 65% humidity, of not more than 1.5.

The film preferably has not more than 20 pinholes in a 7-inch square at 25° C. after a fatigue test involving 1000 times of flexing.

The biaxially oriented polyamide film of the present invention shows, as measured by the method to be mentioned later, an average dimensional change of not more than 3.0% and a difference between the smallest dimensional change and the largest dimensional change of not more than 2.0%, between before immersion in hot water at 95° C. and during the immersion, and an average dimensional change of not more than 4.0% and a difference between the smallest dimensional change and the largest dimensional change of not more than 2.0%, between the film without treatment and the film after withdrawal from said hot water.

The polyamide film of the present invention comprises a resin (X) which is a mixture and/or copolymer of an aromatic polyamide resin (a), except polyamide resin comprising isophthalic acid and aliphatic diamine, and a polyamide resin (b) comprising aliphatic polyamide resin, or isophthalic acid and aliphatic diamine, wherein the aromatic polyamide resin (a) is contained in a proportion of not less than 10 mol % and not more than 90 mol %, or the film comprises X in a proportion of not less than 5 parts by weight and an aliphatic polyamide resin (Y) in a proportion of not more than 95 parts by weight.

The upper limit of (a) in the aforementioned X is 90 mol %, preferably 80 mol %. The (b) in X is preferably an aliphatic polyamide resin.

More preferably, the film comprises the aforementioned X in 90–4 parts by weight, the aforementioned Y in 0–95.8 parts by weight and an improver of resistance to fatigue from fleeing (Z) in 0.2–10 parts by weight.

The aromatic polyamide to be used in the present invention comprises at least one of aromatic dicarboxylic acid (e.g., terephthalic acid, naphthalene dicarboxylic acid and the like), and aromatic diamine (e.g., phenylenediamine, xylylenediamine and the like) as a constituent component of polyamide, wherein dicarboxylic acid and diamine may be aromatic dicarboxylic acid and aromatic diamine, respectively, or one of dicarboxylic acid and diamine is aromatic dicarboxylic acid or aromatic diamine, which may be combined with aliphatic diamine or aliphatic dicarboxylic acid. Preferably, the aromatic polyamide comprises terephthalic acid and aliphatic diamine, or adipic acid and meta-xylylenediamine.

The aliphatic polyamide resin to be used in the present invention is exemplified by nylon 4, nylon 6, nylon 7, nylon 11, nylon 12, nylon 66, nylon 612, nylon 46, copolymers thereof, blends thereof and the like, with preference given to nylon 6 and nylon 66.

The improver of resistance to fatigue from flexing to be used in the present invention is exemplified by block polyester amide, block polyether amide, elastomers such as polyether-ester amide elastomer, polyester elastomer, modified ethylenepropylene rubber, modified acrylic rubber and the like, and ethylene/ac acrylate copolymer.

The polyamide film of the present invention preferably contains inorganic and/or organic particles having an average particle size of 0.5–5.0 μm, preferably 1.0–4.0 μm, in a proportion of 0.05–1.0 part by weight, preferably 0.15–0.7 part by weight, of the total amount of the resin. When the average particle size is less than 0.5 μm, sufficient fine slip characteristic cannot be imparted. When it exceeds 5.0 μm, transparency becomes poor and halftone printability is impaired. When the content is less than 0.05 part by weight, fine slip characteristic becomes unattainable, whereas when it exceeds 1.0 part by weight, the polyamide film has poor transparency.

The inorganic fine particle to be used is exemplified by silica particle, alumina particle, calcium carbonate particle and the like, and examples of the organic particle include crosslinked acrylic particle, crosslinked polystyrene particle and the like. In the present invention, the fine particle may be of one kind or a combination of two or more kinds. In addition, inorganic particles and organic particles may be used in combination. The use of two or more kinds of particles is preferable for balancing transparency and fine slip characteristic.

The polyamide film of the present invention has a haze value of not more than 5.0% and a coefficient of kinetic friction (A), as measured with regard to friction between the same two polyamide films, of not more than 1.0 under 50% humidity, and a ratio (B)/(A) wherein (B) is a coefficient of kinetic friction under 65% humidity, of not more than 1.5.

The polyamide film of the present invention is free of increase in contact area due to moisture absorption even in use in a high humidity environment. Consequently, degradation of slip characteristics can be prevented and the film has a significantly improved handling property and workability during processing The biaxially oriented polyamide film of the present invention shows an average dimensional change of not more than 3.0% and a difference between the smallest dimensional change and the largest dimensional change of not more than 2.0%, between before immersion in hot water at 95° C. and during the immersion, and an average dimensional change of not more than 4.0% and a difference between the smallest dimensional change and the largest dimensional change of not more than 2.0%, between the film without treatment and the film after withdrawal from said hot water, all determined by the methods to be mentioned later.

The average dimensional change is preferably not more than 2.7%, particularly preferably not more than 2.3%, and the difference between the smallest dimensional change and the largest dimensional change is preferably not more than 1.8%, particularly preferably not more than 1.5%, between before immersion in hot water at 95° C. and during the immersion.

The average dimensional change is preferably not more than 3.5%, particularly preferably not more than 3.0%, and the difference between the smallest dimensional change and the largest dimensional change is preferably not more than 1.8%, particularly preferably not more than 1.5%, between the film without treatment and the film after withdrawal from hot water at 95° C.

When the average dimensional change of the aforementioned biaxially oriented polyamide film exceeds 3.0% and/or the difference between the smallest dimensional change and the largest dimensional change exceeds 2.0%, between before immersion in hot water at 95° C. and during the immersion, and when a laminate film is prepared by forming an inorganic vapor deposition layer on this polyamide film, the inorganic vapor deposition layer constituting the gas barrier layer of the laminate film suffers from stress deformation during boiling treatment or retort treatment to cause destruction or peeling of the inorganic vapor deposition layer. Thus, superior gas barrier property cannot be maintained after boiling treatment or retort treatment.

Similarly, when the avenge dimensional change of the aforementioned biaxially oriented polyamide film exceeds 4.0% and/or the difference between the smallest dimensional change and the largest dimensional change exceeds 2.0%, between the film without treatment and the film after withdrawal from hot water at 95° C., and when a laminate film is prepared by forming an inorganic vapor deposition layer on this polyamide film, the inorganic vapor deposition layer constituting the gas barrier layer of the laminate film suffers from stress deformation after boiling treatment or retort treatment to cause destruction or peeling of the inorganic vapor deposition layer. Thus, superior gas barrier property cannot be maintained after boiling treatment or retort treatment.

The polyamide film of the present invention may be a single layer film or a multilayer film.

When the biaxially oriented polyamide film of the present invention is a multilayer film comprising two kinds of layer A and layer B, the layer A is preferably a resin comprising the aforementioned X and Y, or resin comprising X alone, and the layer B is a resin comprising Y alone, a resin comprising Y and X, a resin comprising Y and Z, or a resin comprising X, Y and Z.

Preferably, the layer A comprises X alone or a combination of X in a proportion of not less than 50 parts by weight and Y in a proportion of not more than 50 parts by weight, and the layer B comprises Y alone or a combination of Y in a proportion of not less than 80 parts by weight, X in a proportion of not more than 10 parts by weight and Z in a proportion of not more than 10 parts by weight.

The multilayer film comprising the above-mentioned two kinds of layer A and layer B preferably has a layer structure of A/B or A/B/A, particularly preferably A/B/A, in view of curling.

The thickness percentage of layer A is preferably 5–50%, more preferably 10–40%, and particularly preferably 12–35%. When the layer structure is A/B/A, the thickness percentage of layer A of the aforementioned surface layer is the added figure of each thickness percentage. When the thickness percentage of layer A is less than 5%, the dimensional stability becomes insufficient. When a laminate film is prepared by forming an inorganic vapor deposition layer at least on one side of this polyamide film, the oxygen permeability becomes undesirably low. On the other hand, when the thickness percentage of layer A exceeds 50%, the resistance to fatigue from flexing becomes poor and the number of pinholes increases.

The polyamide film of the present invention may contain various additives as long as the object and property of the film are not impaired . For example, stabilizer, such as antioxidant and light-resistant agent, blocking resistant, anti gelling agent, lubricant, organic lubricant, pigment, antistatic agent, surfactant and the like can be added.

The inventive polyamide film can be formed by a known film-forming method. Examples of the film-forming method include T-die method, inflation technique and the like.

When the inventive biaxially-oriented polyamide film is a multilayer film comprising two kinds of layer A and layer B, the film is preferably formed by drawing a substantially unoriented polyamide sheet having a layer structure of A/B or A/B/A in the longitudinal direction in two steps and then in the transverse direction, followed by thermal curing.

When a substantially unoriented polyamide sheet is drawn in the longitudinal direction, the first drawing is applied and, without cooling to the glass transition temperature or lower, the second drawing is applied. Then, the sheet is drawn in the transverse direction, and thermally set to give a film. For drawing in the longitudinal direction, a known method of drawing in the longitudinal direction can be used, such as heat roll drawing, infrared radient drawing and the like.

A method of forming the preferable biaxially oriented polyamide film of the present invention, which is a multilayer film comprising two kinds of layer A and layer B, is described in detail in the following.

The substantially unoriented polyamide sheet having the layer structure of A/B or A/B/A is formed by melting the polymer constituting each layer in a separate extruder, coextrusion, casting on a rotary drum from a spinneret and rapidly cooling to give a polyamide sheet, or by laminating a polymer constituting each layer, or by combining these methods or by other method. This polyamide sheet is substantially unoriented.

This unoriented polyamide sheet is first stretched at a ratio of 1.1–3.0 times the original at not less than a glass transition temperature (Tg)+10° C. and not more than low crystallization temperature (Tc)+20° C. When the draw ratio is less than 1.1 times, no effect of drawing is provided, whereas when it exceeds 3.0, orientation of crystallization proceeds to cause high drawing stress n the second drawing to be mentioned later, which ultimately results in rupture or rupture in the transverse drawing. The draw ratio is preferably 1.5–2.5. When the drawing temperature is less than Tg+10° C., necking occurs and sheet thickness tends to be inconsistent. When it exceeds Tc+20° C., thermal crystallization markedly proceeds, thereby frequently causing rupture during transverse drawing. More preferably, it is in the range of Tg+20° C.–Tc+10° C.

After the first drawing, the sheet is subjected to the second drawing. The sheet temperature during the period between the two drawing steps characterizes the present invention. To be specific, the sheet is heated and warmed in the first drawing step, and the resultant heat is utilized to pre-heat or heat the film for the second drawing. When the sheet is forcibly cooled after the first drawing and then heated again for the second drawing, heat crystallization noticeably proceeds to increase drawing stress in the transverse direction, resulting in frequent occurrence of rupture. Although heat crystallization also proceeds during heating and warming even without cooling to not more than Tg, the progress is so slow as compared to the combination of the above-mentioned forcible cooling and re-heating that no practical problem occurs.

This sheet is subjected to the second drawing to make the total longitudinal draw ratio 3.1–4.0. When it is less than 3.1, the drawing stress in the transverse direction decreases and less rupture occurs. However, the strength in the longitudinal direction also decreases. When the draw ratio exceeds 4.0, the drawing stress in the transverse direction markedly increases to cause frequent rupture. The total longitudinal draw ratio is preferably 3.3–3.7.

The drawing temperature of the second longitudinal drawing is Tg+10° C.–Tc+20° C. When it is less than Tg+10° C., the drawing stress in the transverse direction markedly increases to cause frequent rupture. When it exceeds Tc+20° C., inconsistent thickness becomes greater and heat crystallization strikingly proceeds to increase rupture and drawing stress in the transverse direction. More preferably, the temperature is Tg+20° C.–Tc+10° C.

The monoaxially oriented polyamide film thus obtained is drawn in the transverse direction at a ratio of 3.0–5.0 times the original using a tenter at a temperature of from 100° C. to less than melting point and wound up after heat setting. Preferably, the temperature of transverse drawing is 100–180° C. and transverse draw ratio is 3.5–4.2. When the temperature of transverse drawing is too low, drawability in the transverse direction becomes poor (causing rupture) and when it is too high, inconsistency in the film thickness increase& When the draw ratio of the transverse drawing is less than 3.0, the strength in the transverse direction decreases.

In this way, the substantially unoriented polyamide sheet having a layer structure of A/B or A/B/A is drawn in the longitudinal direction in two steps, wherein the first drawing is applied and, without cooling to the glass transition temperature or lower, the second drawing is applied, followed by transverse drawing and heat setting, whereby a biaxially oriented polyamide film can be obtained that has an average dimensional change of not more than 3.0% and a difference between the smallest dimensional change and the largest dimensional change of not more than 2.0%, between before immersion in hot water at 95° C. and during the immersion, and an average dimensional change of not more than 4.0% and a difference between the smallest dimensional change and the largest dimensional change of not more than 2.0%, between the film without treatment and the film after withdrawal from said hot water.

It is speculated that the two step longitudinal drawing results in thermohistory of sheet surface sufficient to promote heat crystallization adequately, which in turn leads to the promotion of surface crystallization of the obtained polyamide film, decreased moisture absorption and less dimensional change during immersion in hot water and release from the hot water. The division of the longitudinal drawing into two steps enables reduction of drawing stress, and the maintenance of the heat from the first drawing to the second drawing prevents promotion of crystallization due to hydrogen bond peculiar to polyamide, which crystallization is conventionally produced by forcible cooling and re-heating. In addition, it produces sheet orientation alleviation effect after the first drawing and makes a mild structure of the monoaxially oriented film before transverse drawing. In consequence, orientation in the transverse direction resulting from the transverse drawing is facilitated and drawability can be improved by the less drawing stress in the transverse direction. Taken together, a biaxially oriented polyamide film associated with less operational trouble can be provided economically.

The polyamide film of the present invention can have a polymer layer on the film surface to impart printability and adhesive property upon corona discharge treatment, plasma spray treatment, ultraviolet irradiation treatment, flame treatment and the like, or by coating and the like. In addition, an inorganic layer may be deposited to enhance gas barrier property. Further, a different kind of a resin film such as polyethylene and the like can be laminated on the polyamide film and used as a packaging bag.

The polyamide film of the present invention has an inorganic vapor deposition layer at least on one side thereof to give a gas barrier film having superior gas barrier property even after retort treatment.

According, the polyamide laminate film of the present invention is exemplified by the following.

[1] A polyamide laminate film comprising a polyamide film satisfying the following (a) to (c):
 (a) a haze value of not more than 5.0%,
 (b) a coefficient of kinetic friction (A) of not more than 1.0 under 50% humidity, the coefficient (A) being measured with regard to friction between the same two polyamide films, and
 (c) a ratio of coefficients of kinetic friction (B)/(A) of not more than 1.5, the (B) being a coefficient of kinetic friction at 65% humidity, and an inorganic vapor deposition layer formed at least on one side of the film.

[2] The polyamide laminate film of [1], wherein the polyamide film has not more than 20 pinholes in a 7-inch square at 25° C. after a fatigue test involving 1000 times of flexing.

[3] The polyamide laminate film of [1], wherein the polyamide film comprises a resin (X) which is a m and/or copolymer of an aromatic polyamide resin (a) except polyamide resin comprising isophthalic acid and aliphatic diamine, and a polyamide resin (b) comprising aliphatic polyamide resin, or isophthalic acid and aliphatic diamine, wherein the aromatic polyamide resin (a) is contained in a proportion of not less than 10 mol % and not more than 90 mol %, or the film comprises X in a proportion of not less than 5 parts by weight and an aliphatic polyamide resin (Y) in a proportion of not more than 95 parts by weight.

[4] The polyamide laminate film of [1], wherein the polyamide film comprises a resin (X) which is a mixture and/or copolymer of an aromatic polyamide resin (a) except polyamide resin comprising isophthalic acid and aliphatic diamine, and a polyamide resin (b) comprising aliphatic polyamide resin, or isophthalic acid and aliphatic diamine, wherein the aromatic polyamide resin (a) is contained in a proportion of not less than 10 mol % and not more than 90 mol %, in a proportion of 90–4 parts by weight, an aliphatic polyamide resin (Y) in a proportion of 0–95.8 parts by weight and an improver of resistance to fatigue from flexing (Z) in a proportion of 0.2–10 parts by weight.

[5] The polyamide laminate film of [4], wherein the polyamide film comprises inorganic and/or organic fine particles having an average particle size of 0.5–5.0 μm in a proportion of 0.05–1.0 part by weight relative to the total amount of the resin.

[6] A biaxially oriented polyamide laminate film comprising a biaxially oriented polyamide film showing an average dimensional change of not more than 3.0% and a difference between the smallest dimensional change and the largest dimensional change of not more than 2.0%, between before immersion in hot water at 95° C. and during the immersion, and an average dimensional change of not more than 4.0% and a difference between the smallest dimensional change and the largest dimensional change of not more than 2.0%, between the film without torment and the film after withdrawal from said hot water, and an inorganic vapor deposition layer formed at least on one side of the film.

[7] The biaxially oriented polyamide laminate film of [6], wherein the biaxially oriented polyamide film comprises two kinds of layer A and layer B, the layer A comprising a resin comprising the following X and Y, or X alone, and the layer B comprising a polyamide resin selected from the group consisting of a resin comprising Y alone, a resin comprising Y and X, a resin comprising Y and the following Z, and a resin comprising X, Y and Z, and wherein the film has a layer structure of A/B or A/B/A,
 (X): a resin which is a mixture and/or copolymer of an aromatic polyamide resin (a) comprising terephthalic acid and aliphatic diamine, or adipic acid and meta-xylylenediamine, and a polyamide resin (b) comprising aliphatic polyamide resin, or isophthalic acid and aliphatic diamine, wherein the aromatic polyamide resin (a) is contained in a proportion of not less than 10 mol % and not more than 90 mol %,
 (Y): aliphatic polyamide resin,
 (Z): an improver of resistance to fatigue from flexing.

[8] The biaxially oriented polyamide laminate film of [7], wherein the layer A comprises X alone or a combination of X in a proportion of not less than 50 parts by weight and Y in a proportion of not more than 50 parts by weight, and the layer B comprises Y alone or a combination of Y in a proportion of not less than 80 parts by weight, X in a proportion of not more than 10 parts by weight and Z in a proportion of not more than 10 parts by weight.

[9] The biaxially oriented polyamide laminate film of any of [6]–[8], further comprising an anchor coat layer between the biaxially oriented polyamide film and the inorganic vapor deposition layer.

[10] The billy oriented polyamide laminate film of any of [6]–[8], wherein the inorganic vapor deposition layer is a thin film layer comprising silicon aide, aluminum oxide or a mixture thereof.

[11] A biaxially oriented polyamide laminate film comprising a biaxially oriented polyamide film, an inorganic vapor deposition layer and a sealant layer, said inorganic vapor deposition layer and then the sealant layer being laminated at least on one side of the biaxially oriented polyamide film, the laminate film showing an average dimensional change of not more than 3.0% and a difference between the smallest dimensional change and the largest dimensional change of not more than 2.0%, between before immersion in hot water at 95° C. and during the immersion, and an average dimensional change of not more than 2.0% and a difference between the smallest dimensional change and the largest dimensional change of not more than 2.0%, between the film without treatment and the film after withdrawal from said hot water.

[12] The biaxially oriented polyamide laminate film of [11], wherein the biaxially oriented polyamide film comprises two kinds of layer A and layer B, the layer A comprising a resin comprising the following X and Y, or X alone, and the layer B comprising a polyamide resin selected from the group consisting of a resin comprising Y alone, a resin comprising Y and X, a resin comprising Y and the following Z, and a resin comprising X, Y and Z, and wherein the film has a layer structure of A/B or A/B/A:

(X): a resin which is a mixture and/or copolymer of an aromatic polyamide resin (a) comprising terephthalic acid and aliphatic diamine, or adipic acid and metaxylylenediamine and a polyamide resin (b) comprising aliphatic polyamide resin, or isophthalic acid and aliphatic diamine, wherein the aromatic polyamide resin (a) is contained in a proportion of not less than 10 mol% and not more than 90mol %, (Y): aliphatic polyamide resin, (Z): an improver of resistance to fatigue from flexing.

[13] The biaxially oriented polyamide laminate film of [12], wherein the layer A comprises X alone or a combination of X in a proportion of not less than 50 parts by weight and Y in a proportion of not more than 50 parts by weight, and the layer B comprising Y alone or a combination of Y in a proportion of not less than 80 parts by weight of Y, X in a proportion of not more than 10 parts by weight and Z in a proportion of not more than 10 parts by weight.

[14] The biaxially oriented polyamide laminate film of any of [11]–[13], further comprising an anchor coat layer between the biaxially oriented polyamide film and the inorganic vapor deposition layer.

[15] The biaxially oriented polyamide laminate film of any of [11]–[13], wherein the inorganic vapor deposition layer is a thin film layer comprising silicon oxide, aluminum oxide or a mixture thereof.

Inorganic Vapor Deposition Layer

The inorganic vapor deposition layer constituting the gas barrier layer is exemplified by silicon oxide, aluminum oxide, magnesium oxide, mi thereof and the like. By silicon oxide is meant mixtures of various silicon oxides such as SiO, $SiO_2$ and the like, and by aluminum oxide is meant mixtures of various aluminum oxides such as AlO, $Al_2O_3$ and the like. The binding amount of oxygen in each oxide varies depending on the preparation conditions.

Particularly, a mixture of aluminum oxide and silicon oxide is superior in transparency and flexing resistance, so that it is preferable as a gas barrier layer of the present invention. Further, a mixture of silicon oxide and aluminum oxide having an aluminum oxide content of 5–45 wt % in the gas barrier layer is preferable.

When the aluminum oxide content of the silicon oxide/ aluminum oxide vapor deposition layer is less than 5 wt %, lattice mismatch occurs in the vapor deposition layer, and sufficient gas barrier property cannot be obtained. When the silicon ode/aluminum oxide vapor deposition layer has an aluminum oxide content of over 45 wt %, the layer has less flexibility, causing frequent breakage of layer (crack and peeling off) due to dimensional changes during hot water treatment, and lower barrier property, which is contrary to the object of the present invention.

The more preferable aluminum aide percentage is 10–35 wt %, more preferably 15–25 wt %. The aforementioned silicon oxide/aluminum oxide vapor deposition layer can contain small amounts (up to 3 wt %) of other oxide and the like as long as the property of the layer is not impaired.

The thickness of the aforementioned gas barrier layer comprising silicon oxide and aluminum oxide is general 10–5,000 Å, preferably 50–2,000 Å. When the thickness is less than 10 Å, sufficient gas barrier property may not be obtained. Conversely, when it exceeds 5,000 Å, the effect is not parallel to the thickness but causes lower flexibility and higher production cost.

The aforementioned silicon oxide/aluminum oxide vapor deposition layer can be formed by a known method, such as physical vapor deposition (e.g., vacuum deposition, sputtering, ion plating and the like), and chemical deposition (e.g., CVD). In the vacuum deposition, the material to be deposited includes a mixture of $SiO_2$ and $Al_2O_3$, a mixture of $SiO_2$ and Al and the like. The heating method includes, for example, resistance heating, induction heating, electron beam heating and the like. As the reaction gas, exemplified are oxygen, nitrogen, hydrogen, argon, carbon dioxide, water vapor and the like. In addition, reactive deposition by the addition of ozone, ion assisting and the like may be used. Furthermore, the film forming conditions can be optionally modified; for example, a bias may be added to the substrate or the substrate may be heated or cooled. The aforementioned deposition material, reaction gas, bias loading, heating and cooling can be modified as in the sputtering method and CVD method.

It is also effective to apply corona treatment, flame treatment, low temperature plasma spray treatment, glow discharge treatment, reverse sputtering treatment, surface roughening treatment and the like to the surface of the polyamide film to be the substrate layer before vapor deposition or during vapor deposition, to improve adhesion strength of the vapor deposition layer.

The above-mentioned composition of the silicon oxide/ aluminum oxide layer enables provision of a transparent gas barrier film having superior property that makes the film stand boiling treatment and gelbo flex test (flexing resistance test).

The gas barrier property of the polyamide laminate film of the present invention varies depending on the adhesion strength between the polyamide film to be the substrate layer and the aforementioned gas barrier layer, wherein the greater adhesion strength shows more improved gas barrier property. To achieve superior gas barrier property and to maintain the superior gas barrier property after boiling treatment, the adhesion strength after boiling treatment should be set to not less than 100 g/15 mm. More preferably, the adhesion strength is not less than 150 g/15 mm, more preferably not less than 200 g/15 mm, still more preferably not less than 250 g/15 mm. When the adhesion strength is less than 100 g/15 mm, the gas barrier property may be degraded by boiling treatment. This is because greater adhesion strength prevents occurrence of peeling off of the inorganic vapor deposition layer even when the deposition substrate has somewhat shrunk due to boiling treatment or retort treatment.

To achieve superior adhesion strength, corona treatment, plasma spray treatment, glow discharge treatment, reverse sputtering treatment, surface roughening treatment and the like is applied to the surface of the polyamide film to be the substrate layer of the inorganic vapor deposition layer, or an anchor coat layer is formed on the polyamide film, or other method is employed. However, the method is not limited to those exemplified.

Anchor Coat Layer

The polyamide laminate film of the present invention preferably comprises an anchor coat layer between the aforementioned polyamide film and an inorganic vapor deposition layer to increase adhesion strength. The preferable anchor coat agent to be used includes reactive polyester resin, oil modified alkyd resin, urethane modified alkyd resin, melamine modified alkyd resin, epoxy cured acrylic resin, epoxy resin (cured by amine, carboxyl terminal polyester, phenol, or isocyanate), isocyanate resin (cured by amine, urea, carboxylic acid), urethane polyester resin, polyurethane resin, phenol resin, polyester resin, polyamide resin, reactive acrylic resin, vinyl acetate resin, vinyl chloride resin and the like, and copolymers thereof. These can be used as a water-soluble or water dispersible aqueous resin. It is also effective to use an inorganic anchor coat agent, such as a silane coupling agent and the like, as the anchor coat agent.

The aforementioned anchor coat layer can be formed by an in-line method comprising coating during production of a polyamide film, or an off-line method comprising coating in a separate step other than that of the film production. The coating is performed by a known method. For example, roll coating method, reverse coating method, roll brush method, spray coating method, air knife coating method, gravure coating method, impregnation method, curtain coating and the like can be used.

For improved adhesion strength between the substrate layer and inorganic vapor deposition layer by the formation of the anchor coat layer, the use of an aqueous polyester resin is preferable in view of cost and hygiene. Such polyester resin can be obtained by condensation polymerization of dicarboxylic acid or tricarboxylic acid and glycol. The components to be used for condensation polymerization include, but not limited to, acid component such as terephthalic acid, isophthalic acid, adipic acid, trimellitic acid and the like, and glycol component such as ethylene glycol, neopentyl glycol, butanediol, ethylene mol modified bisphenol A and the like. This polyester resin may be obtained by graft copolymerization of an acrylic monomer.

The anchor coat layer preferably has a thickness of 0.01–10 μm, more preferably 0.02–5 μm. When the thickness is less than 0.02 μm, the adhesion strength may not be sufficiently improved, and an excess thickness over 5 μm also results in a failure to improve adhesive property and is economically disadvantageous.

Polyamide Film

The polyamide film to be the substrate layer of the polyamide laminate film of the present invention includes the following.

[1] A polyamide film satisfying the following (a) to (c):
(a) a haze value of not more than 5.0%,
(b) a coefficient of kinetic friction (A) of not more than 1.0 under 50% humidity, the coefficient (A) being measured with regard to fiction between the same two polyamide films, and
(c) a ratio of coefficients of kinetic friction (B)/(A) of not more than 1.5, the (B) being a coefficient of kinetic friction at 65% humidity.

[2] The polyamide film of [1], wherein the film has not more than 20 pinholes in a 7-inch square at 25° C. after a fatigue test involving 1000 times of flexing.

[3] The polyamide film of [1], wherein the film comprises a resin (X) which is a mixture and/or copolymer of an aromatic polyamide resin (a) except polyamide resin comprising isophthalic acid and aliphatic diamine, and a polyamide resin (b) comprising aliphatic polyamide resin, or isophthalic acid and aliphatic diamine, wherein the aromatic polyamide resin (a) is contained in a proportion of not less than 10 mol % and not more than 90 mol %, or the film comprises X in a proportion of not less than 5 parts by weight and an aliphatic polyamide resin (Y) in a proportion of not more than 95 parts by weight.

[4] The polyamide film of [1], wherein the film comprises of a resin (X) which is a mixture and/or copolymer of an aromatic polyamide resin (a) except polyamide resin comprising isophthalic acid and aliphatic diamine, and a polyamide resin (b) comprising aliphatic polyamide resin, or isophthalic acid and aliphatic diamine, wherein the aromatic polyamide resin (a) is contained in a proportion of not less than 10 mol % and not more than 90 mol %, in a proportion of 90–4 parts by weight, an aliphatic polyamide resin (Y) in a proportion of 0–95.8 parts by weight and an improver of resistance to fatigue from flexing (Z) in a proportion of 0.2–10 parts by weight.

[5] The polyamide film of [4], further comprising inorganic and/or organic fine particles having an average particle size of 0.5–5.0 μm in a proportion of 0.05–1.0 part by weight relative to the total amount of the resin.

[6] A biaxially oriented polyamide film showing an average dimensional change of not more than 3.0% and a difference between the smallest dimensional change and the largest dimensional change of not more than 2.0%, between before immersion in hot water at 95° C. and during the immersion, and an avenge dimensional change of not more than 4.0% and a difference between the smallest dimensional change and the largest dimensional change of not more than 2.0% between the film without treatment and the film after withdrawal from said hot water, said dimensional change being measured with regard to test samples cut out in all directions at 10° pitch from the film.

[7] The biaxially oriented polyamide film of [6], wherein the film comprises two kinds of a layer A and a layer B, the layer A comprising a resin comprising the following X and Y, or X alone, and the layer B comprising a polyamide resin selected from the group consisting of a resin comprising Y alone, a resin comprising Y and X, a resin comprising Y and the following Z, and a resin comprising X, Y and Z, and wherein the film has a layer structure of A/B or A/B/A, (X): a resin which is a mixture and/or copolymer of an aromatic polyamide resin (a) comprising terephthalic acid and aliphatic diamine, or adipic acid and meta-xylylenediamine, and a polyamide resin (b) comprising aliphatic polyamide resin, or isophthalic acid and aliphatic diamine, wherein the aromatic polyamide resin (a) is contained in a proportion of not less than 10 mol % and not more than 90 mol %, (Y): aliphatic polyamide resin, (Z): an improver of resistance to fatigue from flexing.

[8] The biaxially oriented polyamide film of [7], wherein the layer A comprises X alone or a combination of X in a proportion of not less than 50 parts by weight and Y in a proportion of not more than 50 parts by weight, and the layer B comprises Y alone or a combination of Y in a proportion of not less than 80 parts by weight, X in a proportion of not more than 10 parts by weight and Z in a proportion of not more than 10 parts by weight.

The biaxially oriented polyamide laminate film comprising a biaxially oriented polyamide film, an inorganic vapor deposition layer and a sealant layer, wherein the inorganic vapor deposition layer and then the sealant layer are laminated at least on one side of the above-mentioned biaxially oriented polyamide film, shows an average dimensional change of not more than 3.0% and a difference between the smallest dimensional change and the largest dimensional change of not more than 2.0%, between before immersion in hot water at 95° C. and during the immersion, and an average dimensional change of not more than 2.0% and a difference between the smallest dimensional change and the largest dimensional change of not more than 2.0%, between the film without treatment and the film after withdrawal from said hot water, all determined by the methods to be mentioned later.

The average dimensional change is preferably not more than 2.7%, particularly preferably not more than 2.3%, and the difference between the smallest dimensional change and the largest dimensional change is preferably not more than 1.8%, particularly preferably not more than 1.5%, between before immersion in hot water at 95° C. and during the immersion.

The average dimensional change is preferably not more than 1.8%, particularly preferably not more than 1.5%, and the difference between the smallest dimensional change and the largest dimensional change is preferably not more than 1.8%, particularly preferably not more than 1.5%, between the film without treatment and the film after withdrawal from hot water at 95° C.

When the average dimensional change of the aforementioned biaxially oriented polyamide laminate film exceeds 3.0% and/or the difference between the smallest dimensional change and the largest dimensional change exceeds 2.0%, between before immersion in hot water at 95° C. and during the immersion, the inorganic vapor deposition layer constituting the gas barrier layer of the laminate film suffers from stress deformation during boiling treatment or retort treatment to cause destruction or peeling of the inorganic vapor deposition layer, and superior gas barrier property cannot be maintained after boiling treatment or retort treatment.

Similarly, when the average dimensional change of the aforementioned biaxially oriented polyamide laminate film exceeds 2.0% and/or the difference between the smallest dimensional change and the largest dimensional change exceeds 2.0%, between the film without treatment and the film after withdrawal from hot water at 95° C. as determined by the below-noted method, the inorganic vapor deposition layer constituting the gas barrier layer of the laminate film suffers from stress deformation after boiling treatment or retort treatment to cause destruction or peeling of the inorganic vapor deposition layer, and superior gas barrier property cannot be maintained after boiling treatment or retort treatment.

That is, by setting the average dimensional change of the aforementioned biaxially oriented polyamide laminate film to not more than 3.0% and a difference between the smallest dimensional change and the largest dimensional change to not more than 2.0%, between before immersion in hot water at 95° C. and during the immersion, and an average dimensional change to not more than 2.0% and a difference between the smallest dimensional change and the largest dimensional change to not more than 2.0%, between the film without treatment and the film after withdrawal from said hot water, superior gas barrier property can be maintained even after boiling treatment or retort treatment.

Sealant Layer

In the above-mentioned biaxially oriented polyamide laminate film, a sealant layer (heat sealing layer) made from a polyolefin resin is preferably formed to impart thermal adhesive property to the surface of the inorganic vapor deposition layer. By adhering the sealant layers by heat sealing, the biaxially oriented polyamide laminate film can be processed into a bag for use as a packaging material.

The polyolefin resin constituting the sealant layer is not necessarily a monolayer but may have a multilayer structure. The resin constituting each layer of the multilayer structure may be a combination of the same resins, or may be a laminate of a copolymer of heterologous polymers, a modified product, a blend and the like. For superior laminating property and higher heat sealing property, for example, a polymer having a lower glass transition temperature (Tg) or lower melting point than that of a base thermoplastic polyolefin resin may be used, or to impart heat resistance, a polymer having higher Tg or melting point than that of a base thermoplastic polyolefin resin can be added.

The above-mentioned polyolefin resin may comprise, where necessary, various additives, such as plasticizers, heat stabilizers, ultraviolet absorbers, antioxidants, colorant, fillers, antistatic agents, antimicrobial agents, lubricants, blocking resistants, and the like.

In addition, the aforementioned polyolefin resin can be formed on an inorganic vapor deposition layer as a sealant layer by dry laminating or wet laminating using an adhesive, melt extrusion laminating, coextrusion laminating and the like.

Adhesive Layer

The aforementioned sealant layer also functions as a protecting layer of the inorganic vapor deposition layer. An increased adhesion strength between the inorganic vapor deposition layer and sealant layer is extremely effective for efficient exercise of the function. For this end, the above-mentioned biaxially oriented polyamide laminate film preferably has an adhesive layer between the inorganic vapor deposition layer and sealant layer. The resin constituting the adhesive layer is particularly preferably a resin having a glass transition temperature of $-10°$ C.$-40°$ C., such as polyurethane resin, polyester resin, epoxy resin, vinyl chloride resin, vinyl acetate resin, polyethylene resin, polypropylene resin, melamine resin, acrylic resin and the like, which may be used alone or in combination upon melt mixing. It is also effective to use an adhesive composition containing a compound having a functional group such as a carboxylic acid group, acid anhydride, (meth)acrylic acid and (meth)acrylate ester skeleton; an epoxy compound having a glycidyl group or glycidyl ether group; and/or a curing agent or cure accelerator having a reactive functional group such as oxazoline group, isocyanate group, amino group, hydroxyl group and the like.

Paper, aluminum foil wood, cloth, nonwoven fabric, a printing layer, a printing film and the like can be laminated on the polyamide laminate film of the present invention, where necessary, besides the above-mentioned each layer component.

The polyamide laminate film of the present invention can be used as a wrapping material for fermented soybean paste, pickles, side dish, baby food, shellfish boiled in sweetened soy sauce, konnyaku, tubular roll of boiled fish paste, boiled fish paste, processed marine products, processed meat products (e.g., meatball, hamburger steak, Mongolian mutton barbecue, ham, sausage and others), green tea, coffee, black tea, dried bonito, tangle flakes, oil confectionery (e.g., potato chips and butter peanut), rice crackers, biscuit, cookie, cake, steamed bun, castella, cheese, butter, cut rice cake, soup, sauce, noodle, wasabi, and the like, tooth paste and the like, in view of its superior gas barrier property, gas barrier retention after boiling treatment and retort treatment and superior secondary processing property. In addition, it can be used as an industrial packaging material for pet food, agricultural chemical, fertilizer, fusion pack, semiconductor, precious products, medical, electronic, chemical and machinery products and the like. The form of the wrapping material is free of particular limitation and can be used widely in the form of a bag, lid, cup, tube, standing bag and the like.

The present invention is explained in detail by illustrative Examples, to which the present invention is not limited in any way. The present invention encompasses any modification, change or alteration as long as it is within the spirit and scope of the present invention. The measurement of the properties referred to in the present specification followed the measurement methods below.

(1) Haze Value

According to JIS-K6714, haze value was measured using a haze tester manufactured by TOYO SEIKI, CO., LTD.

(2) Coefficient of Kinetic Friction

The coefficient of kinetic friction between the surfaces of two films free of treatment with surfactant was measured under 50% RH or 65% RH according to ASTM-D-1894.

(3) Resistance to Fatigue from Flexing:

The resistance to fatigue from flexing (hereinafter gelbo flex test) was tested using a gelbo flex tester manufactured by RIGAKU KOGYO, CO., LTD. and evaluated in the following manner.

(3)-1: Examples 1–4, Comparative Examples 1 and 2:

A film was fixed with one side thereof attached to the fixed head side (diameter 3.5 inches) and the other side attached to the movable head side, and the initial holding intervals were set to 7 inches. Flexing fatigue, created by twisting 440 degrees for the first 3.5 inches of the stroke, and finishing the entire stroke in the subsequent 2.5 inches by linear horizontal movement, was applied 1000 times at a rate of 40 times/min. The film was removed, placed on a white board, a solution obtained by diluting Methylene Blue with ethanol was applied to the film surface, the film was removed and the number of the spots of the aforementioned solution passed through the pinholes in the film onto the 7-inch square paper board was macroscopically evaluated. The evaluation was performed at 25° C.

(3)-2: Examples 5–11 and Comparative Examples 3–8:

A (MIL-B131H)DE 112 inch×8 inch test piece was made into a cylinder of diameter 3(½) inches. The both ends were held at an initial holding interval of 7 inches and 400 degree twist was applied at 3(½) inches of stroke. This reciprocal movement was repeated 1000 times at a rate of 40 times/min. The measurement was performed at 20° C. and relative humidity of 65%. The number of pinholes was counted in the manner mentioned above.

(4) Oxygen Permeability

Using an oxygen permeability measurement apparatus (OX-TRAN 10/50A, manufactured by Modern Controls), measurement was done at humidity 0%, temperature 25° C.

(5) Adhesion Strength

A laminate was peeled 180 degrees using a TENSILON UTM2 manufactured by ORIENTEC while applying water to the interface. The S-S curve between the gas barrier layer and substrate layer was measured.

(6) Glass Transition Temperature (Tg) and Low Crystallization Temperature (Tc)

An unoriented polyamide sheet was frozen in liquid nitrogen, thawed under reduced pressure, and subjected to measurement at temperature elevation rate of 10° C./min with DSC manufactured by Seiko Instruments Inc. The obtained heat absorption exotherm curve was used to evaluate Tg and Tc of each polyamide laminate sheet By averaging, Tg and Tc of the unoriented polyamide sheet were estimated.

(7) Film Temperature

The temperature of the film during longitudinal drawing was measured sing a reflective thermometer IR-004 manufactured by MINOLTA CO., LTD.

(8) Film Forming State

Upon biaxially drawing as appropriate under the same conditions for 2 hr, the number of ruptures was counted.

(9) Dimensional change

Strips Length 100 mm×width 10 mm) prepared by cutting out in all directions from a film at 10° pitch were left standing for 2 hours at 23° C., 65% RH, and a base line was drawn at 25 mm from the both ends in the longitudinal direction (the portion to be fixed with a fastener) and the distance between the lines was taken as the length before treatment (A:mm). The strips were fixed with fasteners, applied with initial load of 10 g and in hot water at 95° C. for 30 minutes. Then, using a heat shrink stress tester equipped with a differential conversion displacement meter (manufactured by A and D), the distance between the lines was measured in the state of immersion in the hot water, and the distance was taken as the length after hot water immersion treatment (B:mm). The samples were taken out from the hot water, dried, left standing at 23° C., 65% RH for 2 hr and the distance between the lines was measured. The distance was taken as the length after withdrawing from the hot water (C:mm). The dimensional change was determined by the following formulas (a) and (b). The average dimensional change means the average of the dimensional changes measured using the strips cut out in all directions from the film at 10° pitch. The maximum difference in dimensional change is the difference between the maximum change and the minimum change from among the dimensional changes of the strips measured in the above.

Dimensional change (%) between before and during hot water immersion=|A−B|/A×100     (a)

Dimensional change (%) between the film without treatment and the film after withdrawal from the hot water=|A−C|/A×100   (b)

Polyamide Film

EXAMPLE 1

Nylon 6 (90.6 parts by weight), a nylon 6T/nylon 6 copolymer (4 parts by weight, copolymerization molar ratio 50/50), a polylaurolactam/polyether copolymer (5 parts by weight, manufactured by DAICEL-HÜLS CO., LTD, DAIAMID®) and porous silica (0.4 part by weight, average particle size 1.6 μm) were melt extruded from a T-die, and cooled on a rotary drum at 20° C. to give a 180 μm thick unoriented polyamide film. This unoriented film was drawn at a ratio of 3.0 times the original at 50° C. in the longitudinal direction. Then, the film was drawn at a ratio of 4.0 times the original at 125° C. in the transverse direction and thermally set at 215° C. to give a 15 μm thick biaxially oriented film.

This film was superior in slip characteristic, transparency, resistance to fatigue from flexing, printing property and adhesive property. The property values showing fine slip characteristic, transparency and resistance to fatigue from flexing are shown in Table 1.

EXAMPLE 2

In the same manner as in Example 1, nylon 6 (69.8 parts by weight), a nylon 6T/nylon 6 copolymer (25 parts by weight, copolymerization molar ratio 50/50), a polylaurolactam/polyether copolymer (5 parts by weight) and porous silica (0.2 part by weight, average particle size 1.6 μm) were melt extruded from a T-die, and cooled on a rotary drum at 20° C. to give a 180 μm thick unoriented polyamide film. This unoriented film was stretched at a ratio of 3.0 times the original at 70° C. in the longitudinal direction. Then, the film was drawn at a ratio of 4.0 times the original at 125° C. in the transverse direction and thermally set at 215° C. to give a 15 μm thick biaxially oriented film.

This film was superior in slip characteristic, transparency and resistance to fatigue from flexing. The property values showing fine slip characteristic, transparency and resistance to fatigue from flexing are shown in Table 1.

EXAMPLE 3

In the same manner as in Example 1, nylon 6 (44.8 parts by weight), a nylon 6T/nylon 6 copolymer (50 parts by weight, copolymerization molar ratio 50/50), a polylaurolactam/polyether copolymer (5 parts by weight) and porous silica (0.2 part by weight, average particle size 1.6 μm) were melt extruded from a T-die, and cooled on a rotary drum at 20° C. to give a 180 μm thick unoriented polyamide film. This unoriented film was drawn at a ratio of 3.0 times the original at 90° C. in the longitudinal direction. Then, the film was drawn at a ratio of 4.0 times the original at 135° C. in the transverse direction and thermally set at 215° C. to give a 15 μm thick biaxially oriented film.

This film was superior in slip characteristic, transparency and resistance to fatigue from flexing. The property values showing fine slip characteristic, transparency and resistance to fatigue from flexing are shown in Table 1.

EXAMPLE 4

In the same manner as in Example 1, a nylon 6T/nylon 6 copolymer (94.9 parts by weight, copolymerization molar ratio 50/50), a polylaurolactam/polyether copolymer (5 parts by weight) and porous silica (0.1 part by weight, average particle size 1.6 μm) were melt extruded from a T-die, and cooled on a rotary drum at 20° C. to give a 180 μm thick unoriented polyamide film. This unoriented film was drawn at a ratio of 3.0 times the original at 120° C. in the longitudinal direction. Then, the film was drawn at a ratio of 4.0 times the original at 150° C. in the transverse direction and thermally set at 215° C. to give a 15 μm thick biaxially oriented film.

This film was superior in slip characteristic, transparency and resistance to fatigue from flexing. The property values showing fine slip characteristic, transparency and resistance to fatigue from flexing are shown in Table 1.

COMPARATIVE EXAMPLE 1

In the same manner as in Example 1 except the use of nylon 6 (94.6 parts by weight), a polylaurolactam/polyether copolymer (5 parts by weight) and porous silica (0.4 part by weight, average particle size 1.6 μm), an unoriented polyamide film was obtained. The property values are shown in Table 1. The film of Comparative Example 1 was superior in transparency but poor in slip characteristic under high humidity.

COMPARATIVE EXAMPLE 2

In the same manner as in Example 1 except the use of nylon 6 (93.5 parts by weight), a polylaurolactam/polyether copolymer (5 parts by weight) and porous silica (1.5 parts by weight, average particle size 1.6 μm), an unoriented polyamide film was obtained. The property values are shown in Table 1. The film of Comparative Example 2 was superior in fine slip characteristic but poor in transparency.

TABLE 1

| | Coefficient of kinetic friction (A) 50% RH | Coefficient of kinetic friction (B) 65% RH | Ratio of coefficient of kinetic friction (B)/(A) | Transparency haze value (%) | resistance to fatigue from flexing, number of pinholes |
|---|---|---|---|---|---|
| Ex. 1 | 0.62 | 0.87 | 1.4 | 2.7 | 2 |
| Ex. 2 | 0.56 | 0.73 | 1.3 | 3.0 | 8 |
| Ex. 3 | 0.55 | 0.66 | 1.2 | 3.2 | 10 |
| Ex. 4 | 0.53 | 0.58 | 1.1 | 3.3 | 15 |
| Comp. Ex. 1 | 1.19 | 1.98 | 1.7 | 2.6 | 0 |
| Comp. Ex. 2 | 0.40 | 0.48 | 1.2 | 15.2 | 2 |

Biaxially Oriented Polyamide Laminate Film Having an Inorganic Vapor Deposition Layer

EXAMPLE 5

A mixture of nylon 6 (40 parts by weight) and a nylon 6T/nylon 6 copolymer (60 parts by weight, copolymerization ratio 65/35) as layer A and nylon 6 (100 parts by weight) as layer B was melt extruded from T-die in the thickness percentage of A/B/A of 10/80/10 while laminating and a direct-current high voltage was applied to allow static adhesion of the laminate to the rotary drum at 20° C. The laminate was allowed to cool to solidification to give a 180 μm thick unoriented polyamide sheet. This sheet had a Tg of 47° C. and a Tc of 77° C.

This sheet was first drawn at a ratio of 1.8 times the original in the longitudinal diction at a drawing temperature of 80° C. While maintaining at 75° C., the sheet was secondly drawn (total draw ratio 3.2) at a drawing temperature of 82° C. The sheet was continuously led to a tenter where it was drawn at a ratio of 4.0 times the original in the transverse direction at 130° C. The sheet was thermally set at 210° C., relaxed by 6% in the transverse direction and cooled. The both ends were cut off to give a 15 μm thick biaxially oriented polyamide film. Continuous film forming under the same conditions for 2 hr did not cause rupture. After longitudinal drawing, a water dispersible acrylic graft polyester resin was applied in the solid thickness of about 0.1 μm. This film was superior in resistance to fatigue from flexing and adhesive property.

This film was delivered into a vacuum deposition apparatus. The inside of the chamber was maintained at a pressure of $1 \times 10^{-5}$ Torr and a mixed oxide of $SiO_2$: 70 wt % and $Al_2O_3$: 30 wt % was evaporated by heating with 15 kW electron beam to allow deposition of a 200 Å thick colorless transparent inorganic oxide layer on the coating surface, whereby an inorganic vapor deposition layer was formed. On this inorganic vapor deposition layer was dry laminated an unoriented polyethylene (thickness: 55 µm) as a sealant layer using an adhesive (A310/A10, manufactured by TAKEDA CHEMICAL INDUSTRIES LTD., amount coated 2 g/m²). The laminate was aged at 45° C. for 4 days to give a biaxially oriented polyamide laminate film. The evaluation results of the biaxially oriented polyamide film (the substrate layer) and biaxially oriented polyamide laminate film are shown in Table 2. The biaxially oriented polyamide laminate film was evaluated for (1)–(4) in the Table. The biaxially oriented polyamide film (the substrate layer) was evaluated for film forming state (number of ruptures upon biaxially drawing as appropriate under the same conditions for 2 hr) and (5)–(8) in the Table.

EXAMPLE 6

In the same manner as in Example 5 except the second longitudinal drawing to make the total draw ratio 3.6, a biaxially oriented polyamide laminate film was obtained. Continuous film forming under the same conditions for 2 hr did not cause rupture. The results are shown in Table 2.

EXAMPLE 7

In the same manner as in Example 5 except the use of a mixture of nylon 6 (22 parts by weight) and a nylon 6T/nylon 6 copolymer (78 parts by weight, copolymerization ratio 65/35) as layer A, a biaxially oriented polyamide laminate film was obtained. Continuous film forming under the same conditions for 2 hr did not cause rupture. The results are shown in Table 2.

COMPARATIVE EXAMPLE 3

In the same manner as in Example 5 except the second longitudinal drawing to make the total draw ratio 2.7, a biaxially oriented polyamide laminate film was obtained. Continuous film forming under the same conditions for 2 hr did not cause rupture. The results are shown in Table 2.

COMPARATIVE EXAMPLE 4

In the same manner as in Example 5 except the second longitudinal drawing to make the total draw ratio 4.2, a biaxially oriented polyamide laminate film was obtained. During film forming for 2 hr, 7 ruptures were found. The results are shown in Table 2.

COMPARATIVE EXAMPLE 5

In the same manner as in Example 5 except the use of a mixture of nylon 6 (70 parts by weight) and a nylon 6T/nylon 6 copolymer (30 parts by weight, copolymerization ratio 65/35) as layer A, a biaxially oriented polyamide laminate film was obtained. Continuous film forming under the same conditions for 2 hr did not cause rupture. The results are shown in Table 2.

TABLE 2

| | Production conditions | | Film characteristics | | | | | | | |
|---|---|---|---|---|---|---|---|---|---|---|
| | (A) | (B) | (1) | (2) | (3) | (4) | (5) | (6) | (7) | (8) |
| Ex. 5 | 3.2 | 60 | 1.2 | 10 | 240 | 1 | 2.6 | 1.8 | 3.4 | 1.9 |
| Ex. 6 | 3.6 | 60 | 1.0 | 6 | 260 | 1 | 2.3 | 1.1 | 3.4 | 1.2 |
| Ex. 7 | 3.2 | 78 | 1.1 | 6 | 250 | 1 | 2.2 | 1.4 | 3.0 | 1.5 |

TABLE 2-continued

| | Production conditions | | Film characteristics | | | | | | | |
|---|---|---|---|---|---|---|---|---|---|---|
| | (A) | (B) | (1) | (2) | (3) | (4) | (5) | (6) | (7) | (8) |
| Com. Ex. 3 | 2.7 | 60 | 1.3 | 17 | 270 | 1 | 3.4 | 2.4 | 3.8 | 2.3 |
| Com. Ex. 4 | 4.2 | 60 | 1.2 | 18 | 230 | 2 | 3.2 | 0.9 | 4.4 | 0.8 |
| Com. Ex. 5 | 3.2 | 30 | 1.6 | 23 | 250 | 1 | 4.0 | 2.2 | 4.9 | 2.1 |

(A) Total longitudinal draw ratio.
(B) Mixed amount of nylon 6T/nylon 6 copolymer (wt %) in layer A.
(1) Oxygen permeability (cc/m² · atm · day) of untreated film.
(2) Oxygen permeability (cc/m² · atm · day) of film after immersion in hot water at 95° C. for 30 min and thereafter left standing for 1 hr at 23° C., 65% RH.
(3) Adhesion (g/15 mm) upon dripping water on the peeling interface of the film after immersion in hot water at 95° C. for 30 min and thereafter left standing for 1 hr at 23° C., 65% RH.
(4) Number of pinholes in 7-inch square after testing for resistance to fatigue from flexing.
(5) Average dimensional change (%) between before and during immersion in hot water.
(6) Maximum difference in dimensional change (%) between before and during immersion in hot water.
(7) Average dimensional change (%) between the film without treatment and the film after withdrawal from hot water.
(8) Maximum difference in dimensional change (%) between the film without treatment and the film after withdrawal from hot water.

EXAMPLE 8

A mixture of nylon 6 (35 parts by weight) and a nylon 6T/nylon 6 copolymer (65 parts by weight, copolymerization ratio 65/35) as layer A and nylon 6 (100 parts by weight) as layer B was melt extruded from a T-die in the thickness percentage of A/B/A of 10/80/10 while laminating, and a direct-current high voltage was applied to allow static adhesion of the laminate to the rotary drum at 20° C. The laminate was allowed to cool to solidification to give a 180 µm thick unoriented polyamide sheet This sheet had a Tg of 47° C. and a Tc of 77° C.

This sheet was first drawn at a ratio of 1.8 times the original in the longitudinal direction at a drawing temperature of 78° C. While maintaining at 75° C., the sheet was secondly drawn (total draw ratio 3.2) in the longitudinal direction at a drawing temperature of 80° C. The sheet was continuously led to a tenter where it was drawn at a ratio of 4 times the original in the transverse direction at 135° C. The sheet was thermally set at 210° C., relaxed by 6% in the transverse direction and cooled. The both ends were cut off to give a 15 µm thick biaxially oriented polyamide film. Continuous film forming under the same conditions for 2 hr did not cause rupture. After longitudinal drawing, a water dispersible acrylic graft polyester resin was applied in the solid thickness of about 0.1 µm. This film was superior in resistance to fatigue from flexing and adhesive property.

This film was delivered into a vacuum vapor deposition apparatus. The inside of the chamber was maintained at a pressure of $1 \times 10^{-5}$ Torr and a mixed oxide of $SiO_2$: 70 wt % and $Al_2O_3$: 30 wt % was evaporated by heating with 15 kW electron bean to allow deposition of a 190 Å thick colorless transparent inorganic oxide layer on the coating surface, whereby an inorganic vapor deposition layer was obtained. On this inorganic vapor deposition layer was dry laminated an unoriented polyethylene (thickness: 50 µm) as a sealant layer using an adhesive (A310/A10, manufactured by TAKEDA CHEMICAL INDUSTRIES LTD., amount coated 2 g/m²). The laminate was aged at 45° C. for 4 days to give a biaxially oriented polyamide laminate film.

The evaluation results of the biaxially oriented polyamide film (the substrate layer) and biaxially oriented polyamide laminate film are shown in Table 3. The biaxially oriented polyamide laminate film was evaluated for (5)–(8) in the Table. The biaxially oriented polyamide film (the substrate layer) was evaluated for film forming state (number of ruptures upon biaxially drawing as appropriate under the same conditions for 2 hr) and (1)–(4) in the Table.

EXAMPLE 9

In the same manner as in Example 8 except the second longitudinal drawing to make the total draw ratio 3.5, a biaxially oriented polyamide laminate film was obtained. When manufacturing the biaxially oriented polyamide film (the substrate layer), continuous film forming under the same conditions for 2 hr did not cause rupture. The results are shown in Table 3.

EXAMPLE 10

In the same manner as in Example 8 except the use of a mixture of nylon 6 (20 parts by weight) and a nylon 6T/nylon 6 copolymer (80 parts by weight, copolymerization ratio 65/35) as layer A, a biaxially oriented polyamide laminate film was obtained. When manufacturing the biaxially oriented polyamide film (the substrate layer), continuous film forming under the same conditions for 2 hr did not cause rupture. The results are shown in Table 3.

EXAMPLE 11

In the same manner as in Example 8 except the use of a mixture of nylon 6 (20 parts by weight) and a nylon MXD-6 (80 parts by weight) as layer A, a biaxially oriented polyamide laminate film was obtained. When manufacturing the biaxially oriented polyamide film (the substrate layer), continuous film forming under the same conditions for 2 hr did not cause rupture. The results are shown in Table 3.

COMPARATIVE EXAMPLE 6

In the same manner as in Example 8 except the second longitudinal drawing to make the total draw ratio 2.6, a biaxially oriented polyamide laminate film was obtained. When manufacturing the biaxially oriented polyamide film (the substrate layer), continuous film forming under the same conditions for 2 hr did not cause rupture. The results are shown in Table 3.

COMPARATIVE EXAMPLE 7

In the same manner as in Example 8 except the use of a mixture of nylon 6 (80 parts by weight) and a nylon 6T/nylon 6 copolymer (20 parts by weight, copolymerization ratio 65/35) as layer A, a biaxially oriented polyamide laminate film was obtained. When manufacturing the biaxially oriented polyamide film (the substrate layer), continuous film forming under the same conditions for 2 hr did not cause rupture. The results are shown in Table 3.

COMPARATIVE EXAMPLE 8

In the same manner as in Example 8 except the use of a mixture of nylon 6(80 parts by weight) and a nylon MXD-6 (20 parts by weight) as layer A, a biaxially oriented polyamide laminate film was obtained. When manufacturing the biaxially oriented polyamide film (the substrate layer), continuous film forming under the same conditions for 2 hr did not cause rupture. The results are shown in Table 3.

TABLE 3

| | Production conditions | | Film characteristics | | | | | | | |
|---|---|---|---|---|---|---|---|---|---|---|
| | (A) | (B) | (1) | (2) | (3) | (4) | (5) | (6) | (7) | (8) |
| Ex. 8 | 3.2 | 65 | 1.0 | 11 | 230 | 1 | 2.5 | 1.6 | 1.7 | 1.8 |
| Ex. 9 | 3.5 | 65 | 0.9 | 7 | 260 | 1 | 2.2 | 1.2 | 1.8 | 1.4 |
| Ex. 10 | 3.2 | 80 | 1.0 | 6 | 250 | 1 | 2.1 | 1.5 | 1.8 | 1.7 |
| Ex. 11 | 3.2 | 80 | 0.8 | 12 | 250 | 0 | 2.7 | 1.7 | 1.9 | 1.7 |
| Com. Ex. 6 | 2.6 | 65 | 1.1 | 19 | 220 | 1 | 3.4 | 2.6 | 2.1 | 2.6 |
| Com. Ex. 7 | 3.2 | 20 | 1.0 | 32 | 240 | 1 | 4.2 | 2.3 | 2.4 | 2.0 |
| Com. Ex. 8 | 3.2 | 20 | 1.0 | 41 | 230 | 0 | 4.4 | 2.2 | 2.1 | 2.2 |

(A) Total longitudinal draw ratio.
(B) Mixed amount of nylon 6T/nylon 6 copolymer or nylon MXD-6 (wt %) in layer A.
(1) Oxygen permeability (cc/m$^2$ · atm · day) of untreated film.
(2) Oxygen permeability (cc/m$^2$ · atm · day) of film after immersion in hot water at 95° C. for 30 min and thereafter left standing for 1 hr at 23° C., 65% RH.
(3) Adhesion (g/15 mm) upon dripping water on the peeling interface of the film after immersion in hot water at 95° C. for 30 min and thereafter left standing for 1 hr at 23° C., 65% RH.
(4) Number of pinholes in 7-inch square after testing for resistance to fatigue from flexing.
(5) Average dimensional change (%) between before and during immersion in hot water.
(6) Maximum difference in dimensional change (%) between before and during immersion in hot water.
(7) Average dimensional change (%) between the film without treatment and the film after withdrawal from hot water.
(8) Maximum difference in dimensional change (%) between the film without treatment and the film after withdrawal from hot water.

The polyamide film of the present invention is superior in transparency, slip characteristic, particularly transparency and slip characteristics under high humidity, and flexing resistance. The polyamide film of the present invention shows small dimensional change due to moisture absorption and heating. The biaxially oriented polyamide laminate film having an inorganic vapor deposition layer retains superior gas barrier property after boiling treatment and has superior resistance to fatigue from flexing.

This application is based on application Nos. 143671/1998, 45140/1999 and 45142/1999 filed in Japan, the contents of which are incorporated hereinto by reference.

What is claimed is:

1. A polyamide film satisfying the following (a) to (d):
   (a) a haze value of not more than 5.0%,
   (b) a coefficient of kinetic friction (A) of not more than 1.0 under 50% humidity, wherein the coefficient (A) is a measure of the friction between two surfaces of a polyamide film brought into sliding contact with one another,
   (c) a ratio of coefficients of kinetic friction (B)/(A) of not more than 1.5, the (B) being a coefficient of kinetic friction at 65% humidity, and
   (d) comprising inorganic and/or organic fine particles having an average particle size of 0.5–5.0 μm in a proportion of 0.05–1.0 part by weight relative to the total amount of resin.

2. The polyamide film of claim 1, wherein the film has not more than 20 pinholes in a 7-inch square at 25° C. after a fatigue test involving 1000 times of flexing.

3. The polyamide film of claim 1, wherein the film comprises a resin (X) which is a mixture and/or copolymer of an aromatic polyamide resin (a) except polyamide resin comprising isophthalic acid and aliphatic diamine, and a polyamide resin (b) comprising aliphatic polyamide resin, or isophthalic acid and aliphatic diamine, wherein the aromatic polyamide resin (a) is contained in a proportion of not less than 10 mol % and not more than 90 mol %, or the film comprises X in a proportion of not less than 5 parts by weight and an aliphatic polyamide resin (Y) in a proportion of not more than 95 parts by weight.

4. The polyamide film of claim 1, wherein the film comprises of a resin (X) which is a mixture and/or copolymer of an aromatic polyamide resin (a) except polyamide resin comprising isophthalic acid and aliphatic diamine, and a polyamide resin (b) comprising aliphatic polyamide resin, or isophthalic acid and aliphatic diamine, wherein the aromatic polyamide resin (a) is contained in a proportion of not less than 10 mol % and not more than 90 mol %, in a proportion of 90–4 parts by weight, an aliphatic polyamide resin M in a proportion of 0–95.8 parts by weight and an improver of resistance to fatigue from flexing (Z) in a proportion of 0.2–10 parts by weight.

5. A biaxially oriented polyamide film which comprises at least one layer comprising a resin comprising the following X and Y, or X alone, and which exhibits an average dimensional change of not more than 3.0% and a difference between the smallest dimensional change and the largest dimensional change of not more than 2.0%, prior to immersion in hot water at 95° C. and during the immersion, and an average dimensional change of not more than 4.0% and a difference between the smallest dimensional change and the largest dimensional change of not more than 2.0%, prior to treatment and after withdrawal from said hot water, said dimensional change being measured with regard to test samples cut out in all directions at 10° pitch from the film, wherein (X) is a resin which is a mixture and/or copolymer of an aromatic polyamide resin (a) comprising terephthalic acid and aliphatic diamine, or adipic acid and metaxylylenediamine, and a polyamide resin (b) comprising aliphatic polyamide resin, or isophthalic acid and aliphatic diamine, wherein the amount of the aromatic polyamide resin (a) is not less than 10 mol % and not more than 90 mol %; and (Y) is an aliphatic polyamide resin.

6. The biaxially oriented polyamide film of claim 5, wherein the film comprises two kinds of a layer A and a layer B, the layer A comprising a resin comprising the following X and Y, or X alone, and the layer B comprising a polyamide resin selected from the group consisting of a resin comprising Y alone, a resin comprising Y and X, a resin comprising Y and the following Z, and a resin comprising X, Y and Z, and wherein the film has a layer structure of A/B or A/B/A, (X): a resin which is a re and/or copolymer of an aromatic polyamide resin (a) comprising terephthalic acid and aliphatic diamine, or adipic add and metaxylylenediamine, and a polyamide resin (b) comprising aliphatic polyamide resin, or isophthalic acid and aliphatic diamine, wherein the aromatic polyamide resin (a) is contained in a proportion of not less than 10 mol % and not more than 90 mol %, (Y): aliphatic polyamide resin, (Z: an improver of resistance to fatigue from flexing.

7. The biaxially oriented polyamide film of claim 6, wherein the layer A comprises X alone or a combination of X in a proportion of not less than 50 parts by weight and Y in a proportion of not more than 50 parts by weight, and the layer B comprises Y alone or a combination of Y in a proportion of not less than 80 parts by weight, X in a proportion of not more than 10 parts by weight and Z in a proportion of not more than 10 parts by weight.

8. A polyamide laminate film comprising the polyamide film of claim 1, and an inorganic vapor deposition layer formed at least on one side of the film.

9. A biaxially oriented polyamide laminate film comprising the biaxially oriented polyamide film of claim 5, and an inorganic vapor deposition layer formed at least on one side of the film.

10. The biaxially oriented polyamide laminate film of claim 9, further comprising an anchor coat layer between the biaxially oriented polyamide film and the inorganic vapor deposition layer.

11. The biaxially oriented polyamide laminate film of claim 9, wherein the inorganic vapor deposition layer is a thin film layer comprising silicon oxide, aluminum aside or a mixture thereof.

12. A biaxially oriented polyamide laminate film comprising the biaxially oriented polyamide film of claim 6, an inorganic vapor deposition layer and a sealant layer, wherein the inorganic vapor deposition layer and the sealant layer are laminated at least on one side of the biaxially oriented polyamide film.

13. The billy oriented polyamide laminate film of claim 12, wherein the biaxially oriented polyamide film comprises two kinds of a layer A and a layer B, the layer A comprising a resin comprising the following X and Y, or X alone, and the layer B comprising a polyamide resin selected from the group consisting of a resin comprising Y alone, a resin comprising Y and X, a resin comprising Y and the following Z, and a resin comprising X, Y and Z, and wherein the film has a layer structure of A/B or A/B/A:

(X): a resin which is a mixture and/or copolymer of an aromatic polyamide resin (a) comprising terephthalic acid and aliphatic diamine, or adipic add and metaxylylenediamine, and a polyamide resin (b) comprising aliphatic polyamide resin, or isophthalic acid and aliphatic diamine, wherein the aromatic polyamide resin (a) is contained in a proportion of not less than 10 mol % and not more than 90 mol %, (Y): aliphatic polyamide resin, (Z): an improver of resistance to fatigue from flexing.

14. The biaxially oriented polyamide laminate film of claim 13, wherein the layer A comprises X alone or a combination of X in a proportion of not less than 50 parts by weight and Y in a proportion of not more than 50 parts by weight, and the layer B comprises Y alone or a combination of Y in a proportion of not less than 80 parts by weight, X in a proportion of not more than 10 parts by weight and Z in a proportion of not more than 10 parts by weight.

15. The biaxially oriented polyamide laminate film of claim 12, further comprising an anchor coat layer between the biaxially oriented polyamide film and the inorganic vapor deposition layer.

16. The biaxially oriented polyamide laminate film of claim 12, wherein the inorganic vapor deposition layer is a thin film layer comprising silicon oxide, aluminum oxide or a mixture thereof.

* * * * *

UNITED STATES PATENT AND TRADEMARK OFFICE
CERTIFICATE OF CORRECTION

PATENT NO.     : 6,376,093 B1
DATED          : April 23, 2002
INVENTOR(S)    : Fujita S. et al.

It is certified that error appears in the above-identified patent and that said Letters Patent is hereby corrected as shown below:

Title page,
Item [57], ABSTRACT,
Line 4, replace "fiction" with -- friction --
Line 7, replace "billy" with -- biaxially --

Column 1,
Line 23, replace "lie" with -- like --
Line 66, replace "directy" with -- directly --

Column 2,
Line 1, replace "decease" with -- decrease --
Line 62, replace "lie" with -- like --

Column 3,
Line 39, replace "20%" with -- 2% --

Column 6,
Line 1, replace "tan" with -- than --

Column 7,
Line 16, replace "fleeing" with -- flexing --
Line 40, replace "ethylene/ac" with -- ethylene --

Column 10,
Line 54, replace "increase&" with -- increases --

Column 11,
Line 40, replace "According" with -- Accordingly --
Line 58, replace "m" with -- mixture --

Column 12,
Line 27, replace "torment" with -- treatment --
Line 61, replace "billy" with -- biaxially --
Line 63, replace "aide" with -- oxide --

Column 13,
Line 29, replace "90mol %" with -- 90 mol % --
Line 53, replace "mi" with -- mixtures --

Column 14,
Line 2, replace " ode" with -- oxide --
Line 14, "general" with -- generally --

UNITED STATES PATENT AND TRADEMARK OFFICE
CERTIFICATE OF CORRECTION

PATENT NO. : 6,376,093 B1
DATED : April 23, 2002
INVENTOR(S) : Fujita S. et al.

It is certified that error appears in the above-identified patent and that said Letters Patent is hereby corrected as shown below:

Column 15,
Line 47, replace "mol" with -- glycol --
Line 66, replace "fiction" with -- friction --

Column 20,
Line 18, replace "sing" with -- using --
Line 32, replace "shrine" with -- shrinkage --

Column 26,
Line 40, replace "1998,45140" with -- 1998, 45140 --

Column 27,
Line 51, replace "add" with -- acid --

Column 28,
Line 18, replace "aside" with -- oxide --
Line 37, replace "add" with -- acid --

Signed and Sealed this

Twenty-fifth Day of March, 2003

JAMES E. ROGAN
*Director of the United States Patent and Trademark Office*